UNITED STATES PATENT OFFICE.

PAUL THOMASCHEWSKI, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYESTUFF.

1,044,602. Specification of Letters Patent. Patented Nov. 19, 1912.

No Drawing. Application filed March 26, 1912. Serial No. 686,348.

*To all whom it may concern:*

Be it known that I, PAUL THOMASCHEWSKI, doctor of philosophy, chemist, citizen of the German Empire, residing at Vohwinkel, near Elberfeld, Germany, have invented new and useful Improvements in Vat Dyestuff, of which the following is a specification.

I have found that new and valuable coloring matters dyeing cotton from the alkaline hydrosulfite vat generally from yellow to orange to red shades can be obtained by condensing a dichloroanthraquinone compound with an anthraquinone mercaptan.

The new dyes being thioethers having most probably the formula:

(R meaning an anthraquinone radical) are from yellow to orange powders soluble in concentrated sulfuric acid generally with from a blue to green coloration.

In order to illustrate the new process more fully the following example is given, the parts being by weight:—10 parts of anthraquinone-2-mercaptan (sodium salt) and 3 parts of 1.5-dichloroanthraquinone are boiled together with 60 parts of naphthalene during 10 hours. The new thioether precipitates during the reaction as a yellow crystalline powder. The precipitate is filtered off, washed with alcohol and water.

The trianthraquinonyldithioether having most probably the formula:

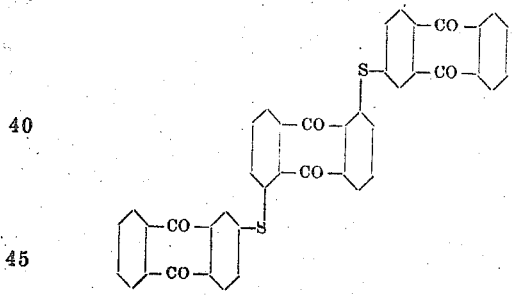

is after being dried and pulverized an orange-yellow powder crystallizing from quinolin in the shape of orange-yellow needles which are soluble in monohydrated sulfuric acid with a greenish-blue coloration and dyeing cotton from an alkaline hydrosulfite vat a pure yellow shade fast to chlorin and to light. The dye can also be produced from 1.5 anthraquinone-dimercaptan and 2 mol. 2-bromo anthraquinone.

Other anthraquinone mercaptans or other dichloroanthraquinones e. g. 1.8-, 1.4-, 1.6-, or 2.7-dichloroanthraquinone may be used.

I claim:—

1. The herein described new vat dyes being dithioethers of the anthraquinone series having most probably the formula:

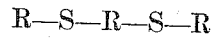

(R meaning an anthraquinone radical) being soluble in concentrated sulfuric acid with from a blue to green coloration; and dyeing cotton from the hydrosulfite vat generally from yellow to orange to red fast shades, substantially as described.

2. The herein described new vat dye being the trianthraquinonyldithioether having most probably the formula:

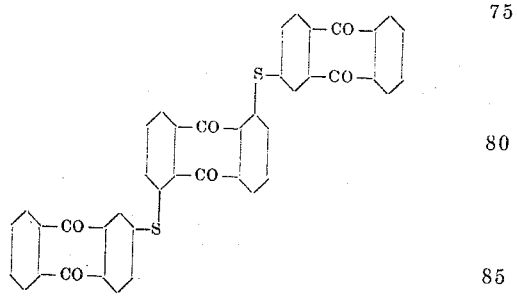

which is after being dried and pulverized an orange-yellow powder crystallizing from quinolin in the shape of orange-yellow needles being soluble in monohydrated sulfuric acid with a greenish-blue coloration; and dyeing cotton from the alkaline hydrosulfite vat pure yellow fast shades, substantially as described.

In testimony whereof I have hereunto set my hand in the presence of two subscribing witnesses.

PAUL THOMASCHEWSKI. [L. S.]

Witnesses:
HELEN NUFER,
ALBERT NUFER.